P. MUELLER & A. C. SCHUERMANN.
METER BRACKET.
APPLICATION FILED NOV. 21, 1910.

993,614.

Patented May 30, 1911.
2 SHEETS—SHEET 1.

Witnesses
H. G. Polnicke
Horace G. Seitz

Inventors
Philip Mueller
Anton C. Schuermann
By Meyers, Cushman & Rea
Attorneys

P. MUELLER & A. C. SCHUERMANN.
METER BRACKET.
APPLICATION FILED NOV. 21, 1910.
993,614.
Patented May 30, 1911.
2 SHEETS—SHEET 2.
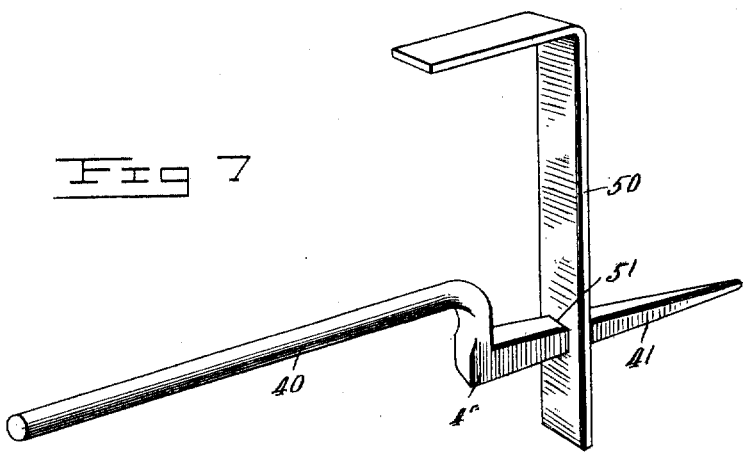
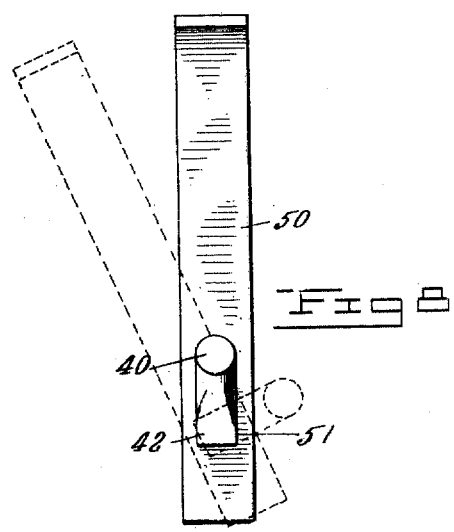
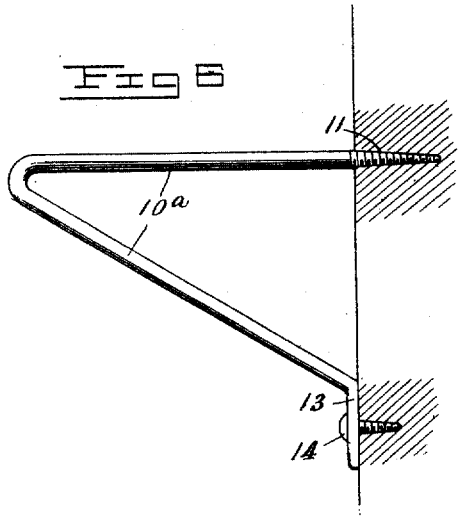
Witnesses
Inventors
Philip Mueller
Anton C. Schuermann
By Meyers, Cushman & Rea
Attorneys

UNITED STATES PATENT OFFICE.

PHILIP MUELLER AND ANTON C. SCHUERMANN, OF DECATUR, ILLINOIS, ASSIGNORS TO THE H. MUELLER MANUFACTURING COMPANY, OF DECATUR, ILLINOIS, A CORPORATION OF ILLINOIS.

METER-BRACKET.

993,614.      Specification of Letters Patent.      Patented May 30, 1911.

Application filed November 21, 1910. Serial No. 593,590.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Meter-Brackets, of which the following is a specification.

Our invention relates to improvements in meter brackets, and has particular reference to devices for adjustably supporting the meter, the bracket being detachably secured to a wall.

Among the objects of our invention are the following: 1. To provide a bracket in which the vertically adjustable member is formed from a single piece. 2. To provide a bracket embodying a wall attaching member, an adjustable sleeve thereon, and a supporting member adjustable in said sleeve, the securing of the supporting member in position securing the sleeve in its adjusted position on the wall member. 3. The provision of a wall member having a circular contour in cross section intermediate its ends and which may be secured to the wall at one or both ends as desired. 4. The provision of a wall member having one of its ends angular, and a spacing member having an opening adapted to fit over the angular end of the wall member, the spacing member being adapted to retain the meter spaced from the wall to which the wall member is secured. 5. To provide a wall member with an angular wall securing end, said end being offset with respect to the main portion of the wall member, whereby the wall member may be driven to provide a support at different planes within the limits of a circle of which the securing end is the approximate center.

Other objects are to provide a structure which is simple and efficient in operation, durable in construction, and which can be made at a relatively low cost.

To these and other ends, the nature of which will be readily understood as the invention is hereinafter disclosed, our invention consists in the improved construction and combination of parts hereinafter fully described, illustrated in the accompanying drawings, and particularly pointed out in the appended claims.

Figure 1:
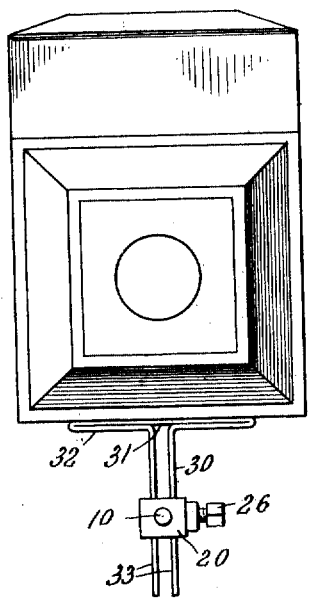
Figure 2:
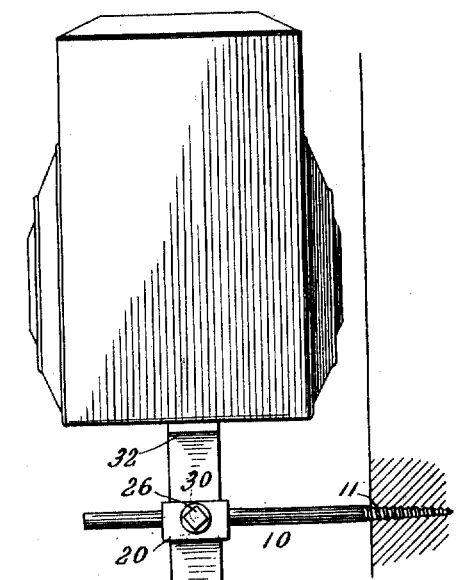
Figure 3:
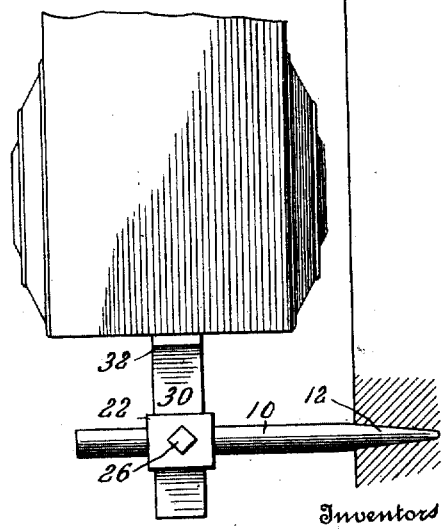
Figure 4:
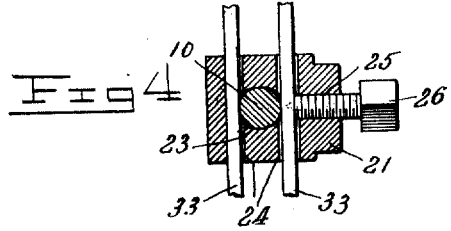
Figure 5:
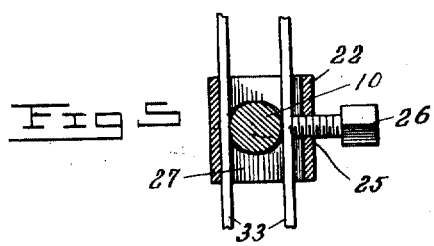

In the accompanying drawings in which similar reference characters indicate similar parts in each of the views,—Figure 1 is a front elevation of a meter seated on a bracket formed in accordance with one of the embodiments of the present invention. Fig. 2 is a side elevation of the same. Fig. 3 is a similar view, showing a different form of wall member. Fig. 4 is a sectional view taken through the sleeve and showing one way of clamping the supporting member in position. Fig. 5 is a similar view of a modified form of sleeve. Fig. 6 is a modified form of wall member. Fig. 7 is a perspective view showing a different form of wall member, and also showing a spacing member mounted thereon. Fig. 8 is a front elevation of the parts shown in Fig. 7, the parts being shown in various positions to indicate the flexibility of use.

In view of the fact that gas meters do not form permanent portions of the service connections, being subject to removal causes, such as the cutting out of service connections, the substitution of a new meter or a meter of different size, etc., it is desirable to provide a shelf or support or bracket for the meter which will not only form an efficient supporting seat therefor after the connections have been made, but which will also serve as a support on which the meter may rest while making the connections, during which time the meter may require movements in various directions in order that the connections may be made with the least difficulty, the final adjustment being made after the connections have been completed. In the present invention this result may be obtained in either one of two ways, the structures disclosed in Figs. 1 to 6 providing one form, while that disclosed in Figs. 7 and 8 will provide another form, the second form, however, being applicable for use, if desired, as a part of the first form.

Referring first to the form shown in Figs. 1 to 6, the bracket is formed substantially of three members, viz., the wall attaching member, the adjusting member, and the supporting member.

The wall attaching member is in the form of a rod 10, as indicated in Figs. 1 to 5, or as a bracket-shaped rod 10ᵃ as shown in Fig. 6. The rod 10 may have one end screw threaded, as at 11 in Figs. 2 and 6, to enable it to be secured in the wall, or it may be wedge-shaped, as indicated at 12 in Fig. 3. In the forms shown in Figs. 2 and 3, as well as in Fig. 6, the rod extends outwardly from the wall as a continuation of the attaching end, the two parts having the same axis; in the form shown in Figs. 7 and 8, this is varied by providing an offset, as presently described, while in the form shown in Fig. 6, the rod is continued in length and bends downwardly at an angle to provide a foot 13 having an opening for the passage of a screw 14, or other attaching device, this particular structure being provided for the purpose of preventing the rod from rotating after being positioned.

The adjusting member, designated as 20, is in the form of a block 21 or loop 22, the block 21 being provided with an opening 23 for the passage of the rod 10 or 10a; the block is also provided with two openings 24 extending at right angles to the opening 23, the openings 24 being substantially parallel and spaced apart a distance so as to provide a slight intersection with opposite sides of the opening 23, as indicated at Fig. 4; the block is also provided with a threaded opening 25 adapted to receive a set screw 26. In the form shown in Fig. 5 the material between the two openings 24, with the exception of a portion at the ends is omitted, thereby forming one large opening 27 in place of the two openings 24, the opening 23 being located at the opposite ends of the member, the opening 25 and set screw 26 being provided in one of the sides.

The supporting member, indicated as 30, is preferably formed of a single piece of material, bent to the form shown in Fig. 1 in which the central portion of the strip, indicated as 31, is adapted to contact with the meter, the ends being bent upon the seating portion 31, as indicated at 32, and then bent at right angles thereto to provide legs 33, the points of bending being such as to provide the legs spaced apart a distance approximately equal to the distance between the openings 24, into which these legs are adapted to pass.

The parts are assembled by simply positioning the member 20 on the rod 10, or bracket 10a by passing the rod through the opening 23; by then inserting the legs 33 into the openings 24, or on opposite sides of the rod 10 in Fig. 5, a tightening of the set screw 26 will cause the legs to be clamped in position between the rod 10 and a wall of the member 20 and the set screw, the tightening of said screw at the same time positioning and securing the member 20 on the rod 10, sufficient clearance being provided in connection with the openings 23 and 24, to provide the necessary movements of the rod 10 and legs 33 to provide this clamping effect.

By this construction it will be readily understood that the set screw 26 controls the position of both members 20 and 30. If the set screw be loosened the member 20 may be moved longitudinally of the rod 10 and the legs may be adjusted vertically in the member 20, and after adjustment a tightening of the screw binds all of the parts together. In this way the legs 33 and member 10 all serve a coöperating function in the clamping action, the particular advantage being that the structure permits of the use of a supporting member formed from a single strip bent upon itself to form legs, the clamping action preventing a relative movement of the legs, and at the same time providing the equivalent of a single leg structure without the disadvantage of the requirement that the parts be offset such as is necessary where a single leg is provided and of a length to permit it to extend through the member 20; in the latter type the weight of the meter would have a constant tendency to turn the member 20 and the rod 10 together, while in the present form the weight is equally distributed on opposite sides of the rod 20 so that there is no tendency to provide for such rotary movement when the parts are in position.

As will be obvious, the member shown in Figs. 7 and 8, and designated as 40, may be substituted for the rods 10 or 10a, in which case the operation of assembling and adjusting might be the same as in the other forms. However, the particular structure of the member 40, being in the form of a rod having its attaching prong 41 offset, as indicated at 42, permits said member to be used alone and at the same time provides for variable adjustments for meter height or position, as will be readily understood by reference to Fig. 8, in which the full line position shows the point of greatest supporting height of the member, while the dotted line position shows it swung to one side and thereby lowering the supporting height.

As will be obvious the member may be positioned at any desired point within the sweep of a circle. The particular advantage of this lies in the fact that this adaptability of adjustment will enable a positioning of this member 49 away from the vertical joint of brick work should it so happen that the installation of the meter is such as to normally place the attaching member in such vertical joint. The offset 42 is also formed with a head by means of which the member may be more readily driven into place.

If desired, we may employ a spacing device 50 for the purpose of retaining the meter spaced from the adjacent wall, said member being in the form of an L-shaped part having an opening 51 for the passage of the major portion of the end 41 of the member 40. As will be readily understood a seating of the meter on the member 40 will permit of a movement longitudinally of the rod, but the presence of the member 50 between the plane of the wall and the meter, provides a permanent space between the two which will prevent moisture of the wall from affecting the meter.

While we have herein shown and described various ways for carrying our invention into effect, it will be readily understood that variations may be made to suit the various conditions arising in meter installation, and we reserve the right to make any and all such modifications therein as may be necessary, and as will fall within the spirit and scope of the invention as expressed in the following claims.

Having thus described our invention, what we claim as new is:

1. A supporting shelf or bracket comprising an attaching member, a one-piece seat member, and a connecting sleeve member for said attaching and seat members, said seat member having legs spaced apart and adapted to straddle and contact with opposite sides of the attaching member within the connecting member when the parts are assembled, and means carried by the connecting member for securing the parts in assembled condition.

2. A supporting shelf or bracket comprising an attaching member, a one-piece seat member, and a connecting sleeve member for said attaching and seat members, said seat member having legs spaced apart and adapted to straddle and contact with opposite sides of the attaching member within the connecting member when the parts are assembled, said attaching and seat members being movable within the connecting member in directions at right angles to each other to permit relative adjustment, and means for securing the parts in adjusted position.

3. A supporting shelf or bracket comprising an attaching member, a one-piece seat member, and a connecting sleeve member for said attaching and seat members, said seat member having legs spaced apart and adapted to straddle and contact with opposite sides of the attaching member within the connecting member when the parts are assembled, said seat and attaching members having a loose mounting within the connecting member whereby one of the legs will be clamped against a wall of the connecting member by the movement of the attaching member when the parts are secured in assembled condition, and means carried by the connecting member for securing the parts in such condition.

4. In a supporting shelf or bracket, a seat member formed of a single strip of material band-like in cross-section and bent upon itself to provide a seating face and two spaced apart legs, and a sleeve having provision for an adjustable positioning and securing of said legs therein.

5. In a supporting shelf or bracket, a seat member formed of a single strip of material band-like in cross-section and bent upon itself to provide a seating face and two spaced apart legs, a sleeve having provision for an adjustable positioning and securing of said legs therein, and an intermediate member between and in contact with both legs and acting to clamp one of the legs to the sleeve.

6. In a supporting shelf or bracket for meters, a member having a projecting prong angular in cross section and extending in off-set relation to the main portion of the member, said prong and main portions of the member having their directions of length in approximately parallel planes, said prong being adapted to serve as a wall penetrating member, the off-set relationship permitting of a positioning of the member to provide for variations in distance between the supporting plane of the main portion and the plane of the prong.

7. In a supporting shelf or bracket for meters, a member having a projecting prong angular in cross section and extending in off-set relation to the main portion of the member, said prong and main portions of the member having their directions of length in approximately parallel planes, said prong being adapted to serve as a wall penetrating member, the off-set relationship permitting of a positioning of the member to provide for variations in distance between the supporting plane of the main portion and the plane of the prong, and a spacing member carried by the prong and adjustable with respect to the main portion.

8. In a supporting shelf or bracket for meters, a member having a projecting prong angular in cross section and extending in off-set relation to the main portion of the member, said prong and main portions of the member having their directions of length in approximately parallel planes, said prong being adapted to serve as a wall penetrating member, the off-set relationship permitting of a positioning of the member to provide for variations in distance between the supporting plane of the main portion and the plane of the prong, and a spacing member having an opening complemental to the cross-sectional configuration of the prong and adapted to receive the latter, whereby the spacing member may be positioned in various positions with respect to the off-set.

9. In a supporting shelf or bracket for meters, a member having a projecting prong angular in cross section and extending in off-set relation to the main portion of the member, said prong and main portions of the member having their directions of length in approximately parallel planes, said prong being adapted to serve as a wall penetrating member, the off-set relationship permitting of a positioning of the member to provide for variations in distance between the supporting plane of the main portion and the plane of the prong, and a spacing member having an opening complemental to the cross sectional configuration of the prong, said member being of L-shape to provide an abutment against which the meter is adapted to rest.

In testimony whereof we have hereunto set our hands in presence of two subscribing witnesses.

PHILIP MUELLER.
ANTON C. SCHUERMANN.

Witnesses:
WILLIAM R. BIDDLE,
LEONARD F. McKIBBEN.

---

Copies of this patent may be obtained for five cents each, by addressing the "Commissioner of Patents, Washington, D. C."